United States Patent Office 2,881,642
Patented Apr. 14, 1959

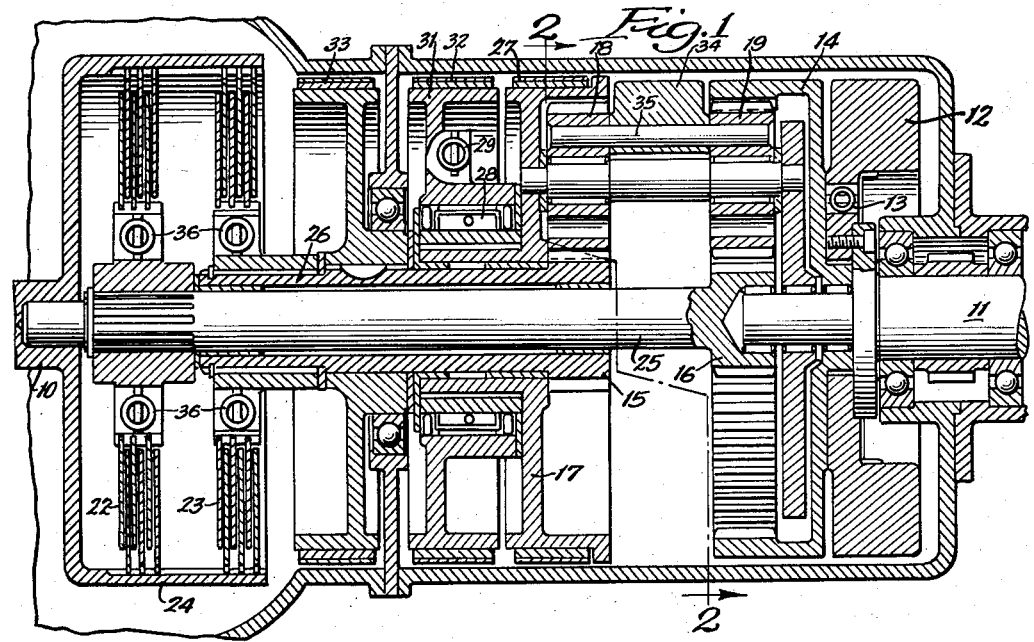
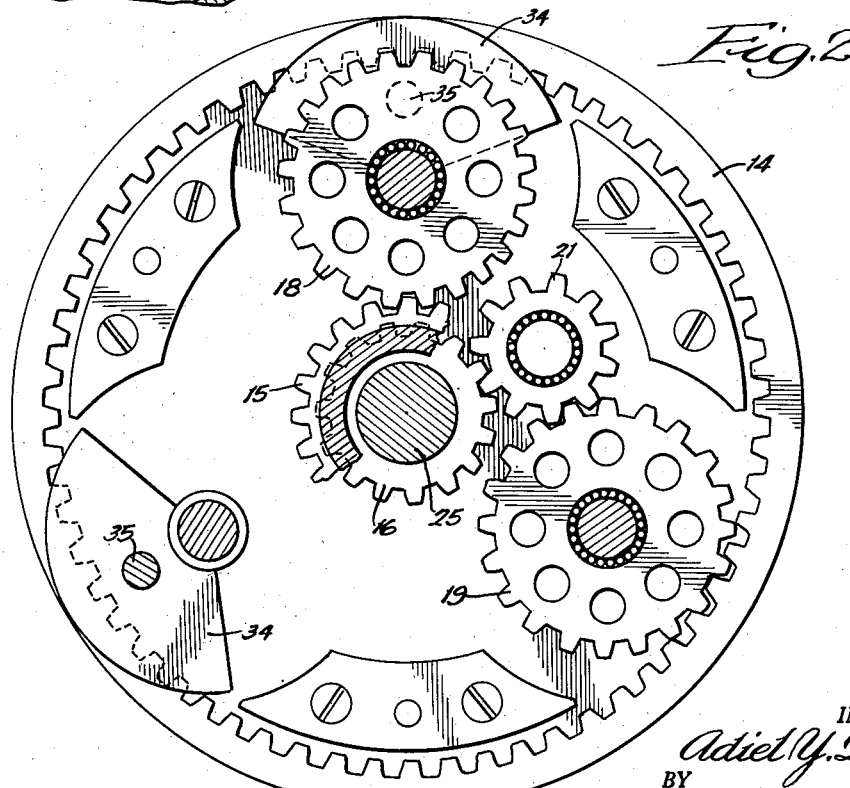

2,881,642

TRANSMISSIONS

Adiel Y. Dodge, Rockford, Ill.

Application March 2, 1953, Serial No. 339,768

5 Claims. (Cl. 74—751)

This invention relates to transmissions and more particularly to mechanical variable speed transmissions of the type used on automotive vehicles. Transmissions as heretofore used on automotive vehicles have been relatively complex and expensive. This is particularly true of transmissions which are capable of automatic speed and torque ratio changes.

For many types of service a relatively inexpensive transmission is demanded which will provide an adequate number of speed and torque ranges to satisfy service conditions. It is also preferable that such transmissions should provide automatic operation through at least a part of its operating range.

It is one of the objects of the present invention to provide a relatively simple and inexpensive transmission which will satisfy these requirements.

Another object is to provide a transmission which will produce at least one positive gear ratio together with an automatic change between such gear ratio and direct drive.

It is one of the main objects of this invention to provide a transmission which automatically produces an infinite number of torque ratios lying between low speed ratio and the 1 to 1 drive.

According to one feature of the invention, the transmission will produce two positive reduced speed ratios, a positive direct drive and reverse, together with an automatic infinitely variable range change between the low speed ratio and direct drive, all with a very simple gear set and simple controls.

A further object is to provide a transmission which is entirely mechanical with automatic changes being effected in response to impulses produced by the rotation of eccentric weights.

The above and other objects and features of the invention will be more readily apparent from the following description when read in connection with the accompanying drawing, in which Figure 1 is an axial section through a transmission embodying the invention, and Figure 2 is a section on the broken line 2—2 of Figure 1.

The transmission, as shown, is adapted to connect a driving shaft 10 which may be the crank shaft of an internal combustion engine, to a driven shaft 11 which may be connected to the wheels of a vehicle. The driven shaft 11 is connected to a balance wheel or fly wheel 12 which is resiliently driven through springs 13 by a ring gear 14. The ring gear forms one element of a compound planetary gear set including a pair of sun gears 15 and 16, a planet carrier 17 and a pair of interconnected pinions 18 and 19 rotatably carried by the carrier.

As shown, the sun gear 15 is larger than the sun gear 16 and meshes with the planet pinions 18. The pinions 18 and 19 may be of the same diameter and the sun gear 16 is small enough to clear the pinion 19. As best seen in Figure 2, idler pinions 21 carried by the carrier mesh with the sun gear 16 and the pinions 19 and the pinions 19 mesh with the ring gear 14.

The sun gears 15 and 16 are adapted to be driven selectively from the driving shaft through clutches 22 and 23. As shown, the driving shaft carries an annular flange 24 in which plates forming parts of the two clutches are splined. The inner clutch plates of the clutch 22 are carried by a shaft 25 connected to the small sun gear 16 and the inner plates of the clutch 23 are carried by a tubular shaft 26 connected to the large sun gear 15. The clutches may be engaged selectively or simultaneously through any desired type of mechanical or hydraulic operating means, not shown.

The gear carrier 17 is adapted to be held stationary by a brake 27 and may be held against rotation in the reverse direction only by a one-way brake 28. The one-way brake 28 is connected through a resilient coil spring 29 to a brake drum 31 which is adapted to be held stationary by a brake 32. Thus, when the brake 32 is engaged the gear carrier will be resiliently held against reverse rotation by the one-way brake. The large sun gear 15 may be held stationary for positive intermediate speed drive when desired by a brake 33.

For positive low speed drive, the clutch 22 and the brake 27 may be engaged to hold the gear carrier against rotation and to drive the sun gear 16 from the driving shaft. At this time, forward rotation of the sun gear 16 is reversed through the idler pinion 21 to turn the pinion 19 forward. Since the gear carrier is held against rotation by the brake 27, the ring gear 14 will be positively driven forward at reduced speed and increased torque.

For positive intermediate drive, the clutch 22 remains engaged, the brake 27 is released and the brake 33 is engaged. At this time, the carrier is free to turn, but the sun gear 15 is held against rotation so that as the planet pinions turn forward, they will roll around the fixed sun gear 15 and turn the carrier forward. The driven shaft will therefore be turned forward at a reduced speed somewhat higher than that of low gear drive. In one desirable construction, low gear drive may produce a ratio of 4 to 1 between the driving and driven shafts, while intermediate drive produces a ratio of 1.615 to 1.

For direct drive forward, the brakes are all released and both clutches are engaged. Under these conditions both of the sun gears will be driven forward at the same speed and torque as the driving shaft and the gear set will turn as a unit in locked condition to turn the driven shaft at the same speed and torque as the driving shaft.

For reverse the clutch 23 is engaged and the brake 27 is engaged. At this time, forward rotation of the sun gear 15 will be reversed through the planet pinions to drive the driven shaft in a reverse direction at reduced speed and increased torque. In a gear set of the proportions shown, the reverse drive ratio will be approximately 3.66 to 1.

For automatic drive, the clutch 22 and the brake 32 are engaged. Under these conditions the gear carrier is held against reverse rotation and drive in a ratio equivalent to the low gear ratio will be produced.

An infinite number of automatic ratio changes are effected by weights 34 secured to the pinions 18 and 19 by pins 35 to form a very compact unitary assembly therewith and lying eccentric to the axis of the pinions. As the pinions turn, rotation of these eccentric weights will produce alternate positive and negative impulses tending respectively to advance the gear carrier more rapidly and to turn the gear carrier in reverse. The reverse impulses are resisted by the one-way brake 28 and compress the springs 29 so that the force of the springs will be added to the positive impulses to turn the gear carrier forward. The forward or positive impulses will be transmitted to the ring gear and driven shaft to drive the driven shaft forward.

In automatic operation the transmission creates positive and negative impulses due to the complex action of the counter-weighted planet gears; turning about their own centers while they swing about the main center.

The positive and negative impulses cause the planet cage to revolve at a non-uniform rate but never less than the low speed ratio (save for the recoil of springs 29), due to the fact that a positive ratio is reached when the cage is stalled. It is desired to convert this uneven motion of the cage to a more uniform velocity. Springs are employed for this purpose. So that the driving force may modulate itself to the cage action, springs 36 are employed. Springs 29 are employed to absorb negative impulses and convert them into positive impulses. Springs 13 are employed to do the final job of smoothing the drive by storing and releasing impulses and delivering them to the fly wheel 12, which is connected to the output member 11.

It will be noted that the springs 29 in connection with the one-way clutch 28 and the brake 32 form the reactionary member through which negative impulses are transmitted to the frame. As the negative impulses diminish, the force stored in the springs 29 is released to help turn the cage forwardly thereby acting as positive impulses, adding themselves to the main impulses created by the counter-weights. Said positive impulses tend to turn the cage forwardly.

It will be seen that in the automatic range at low speeds a positive low gear drive will be produced to turn the driven shaft for starting the vehicle. As the torque demands decrease and as the speed increases, the strength of the impulses will increase to turn the gear carrier forward and produce an infinitely variable speed and torque driving condition. When the torque demands become sufficiently low and the speed becomes sufficiently high, the centrifugal force on the weights will be sufficient to hold them out so that the planet pinions will not rotate. At this time direct drive is produced. Thus, the ratio changes automatically through infinitely variable steps from low gear drive to direct in response to speed and torque.

It will be seen that the present transmission provides two reduced gear ratios plus a positive direct drive and plus an automatic infinitely variable change from low speed ratio to direct with a minimum number of parts. It will further be apparent that the transmission can be controlled manually or automatically, as desired, in a very simple fashion since each ratio change is produced by disengaging one brake or clutch and engaging another.

While one embodiment of the invention has been shown and described herein, it will be understood that this is illustrative only and not to be taken as a definition of the scope of the invention, reference being had for this purpose to the appended claims.

What is claimed is:

1. A transmission for connecting a driving shaft to a driven shaft comprising a planetary gear set including a first element adapted to be connected to the driven shaft, means to connect another element of the gear set to the driving shaft, and a planet carrier having planet pinions rotatably mounted thereon and associated with the first named elements to be rotated about their own axes when the elements turn relative to each other, weights connected to the planet pinions eccentric to the axes thereof to produce alternate positive and negative impulses as the pinions turn, a one-way brake and a resilient member in series connecting the carrier to a stationary part to hold the carrier resiliently against reverse rotation, a resilient member in the connection between said other element and the driving shaft to yield in response to torque impulses, a fly wheel connected to the driven shaft, and resilient means connecting the first element to the fly wheel yieldingly to transmit torque to the fly wheel and the driven shaft.

2. A transmission for connecting a driving shaft to a driven shaft comprising a planetary gear set including a ring gear, a pair of sun gears, a planet carrier, a pair of connected pinions on the carrier, one of the pinions meshing with the ring gear, one of the pinions meshing directly with one of the sun gears, an idler pinion on the carrier meshing with the other of the pinions and the other sun gear, eccentric weights connected to the pinions to produce alternate positive and negative impulses as the pinions rotate, means connecting the ring gear to the driven shaft, means to connect the sun gears selectively to the driving shaft, a brake to hold the carrier against rotation, a one-way brake and spring in series connecting the carrier to a stationary part to hold the carrier resiliently against reverse rotation, and control means to make the one-way brake effective or ineffective.

3. A transmission for connecting a driving shaft to a driven shaft comprising a planetary gear set including a ring gear, a pair of sun gears, a planet carrier, a pair of connected pinions on the carrier, one of the pinions meshing with the ring gear, one of the pinions meshing directly with one of the sun gears, an idler pinion on the carrier meshing with the other of the pinions and the other sun gear, eccentric weights connected to the pinions to produce alternate positive and negative impulses as the pinions rotate, a flywheel connected to the driven shaft, resilient means to connect the ring gear to the flywheel, a pair of clutches each having resilient means in series therewith to connect the sun gears selectively to the driving shaft, a brake to hold the carrier against rotation, and means including a one-way brake to hold the carrier against reverse rotation only.

4. A transmission for connecting a driving shaft to a driven shaft comprising a planetary gear set including a ring gear, a pair of sun gears, a planet carrier, a pair of connected pinions on the carrier, one of the pinions meshing with the ring gear, one of the pinions meshing directly with one of the sun gears, an idler pinion on the carrier meshing with the other of the pinions and the other sun gear, eccentric weights connected to the pinions to produce alternate positive and negative impulses as the pinions rotate, resilient means to connect the ring gear to the driven shaft, a pair of clutches each having resilient means in series therewith to connect the sun gears selectively to the driving shaft, a brake to hold the carrier against rotation, a one-way brake and resilient means in series to hold the carrier against reverse rotation, and a controllable brake to make the one-way brake effective or ineffective.

5. A transmission for connecting a driving shaft to a driven shaft comprising a planetary gear set including a ring gear, a pair of sun gears, a planet carrier, a pair of connected pinions on the carrier, one of the pinions meshing with the ring gear, one of the pinions meshing directly with one of the sun gears, an idler pinion on the carrier meshing with the other of the pinions and the other of the sun gears, eccentric weights connected to the pinions to produce alternate positive and negative impulses as the pinions rotate, resilient means to connect the ring gear to the driven shaft, a pair of clutches each having resilient means in series therewith to connect the sun gears selectively to the driving shaft, a brake to hold the carrier against rotation, a brake to hold said one of the sun gears against rotation, a one-way brake and resilient means in series to hold the carrier against reverse rotation, and a controllable brake to make the one-way brake effective or ineffective.

References Cited in the file of this patent
UNITED STATES PATENTS 1,741,859    Lyman  ---------------- Dec. 31, 1929

(Other references on following page)

UNITED STATES PATENTS

| | | |
|---|---|---|
| 1,773,535 | Lane | Aug. 19, 1930 |
| 1,959,349 | Dodge | May 22, 1934 |
| 2,011,101 | Dodge | Aug. 13, 1935 |
| 2,031,414 | Hobbs | Feb. 18, 1936 |
| 2,179,405 | De Falco | Nov. 7, 1939 |
| 2,220,174 | Ravigneaux | Nov. 5, 1940 |
| 2,304,636 | Gregory | Dec. 8, 1942 |
| 2,549,125 | Paton | Apr. 17, 1951 |
| 2,582,487 | Kelbel | Jan. 15, 1952 |
| 2,605,652 | Kelbel | Aug. 5, 1952 |
| 2,620,685 | Smirl | Dec. 9, 1952 |
| 2,700,312 | Smirl | Jan. 25, 1955 |

FOREIGN PATENTS

| | | |
|---|---|---|
| 502,346 | Great Britain | Mar. 10, 1939 |